Aug. 12, 1952     J. M. COLBY     2,606,759
TWO-STAGE TORSION SPRING SUSPENSION
Filed March 23, 1948     4 Sheets-Sheet 1
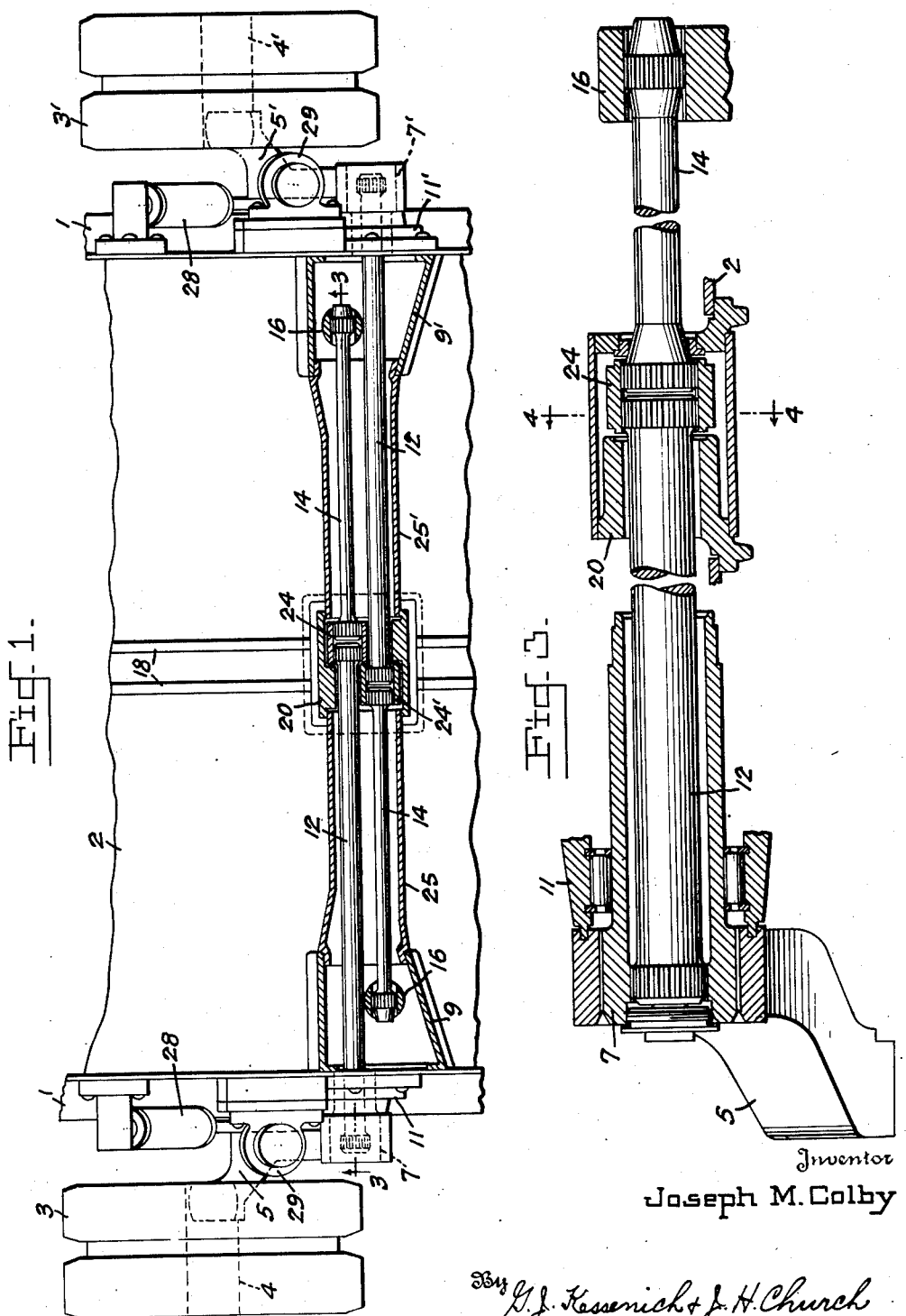
Inventor
Joseph M. Colby Aug. 12, 1952 J. M. COLBY 2,606,759
TWO-STAGE TORSION SPRING SUSPENSION
Filed March 23, 1948 4 Sheets-Sheet 2
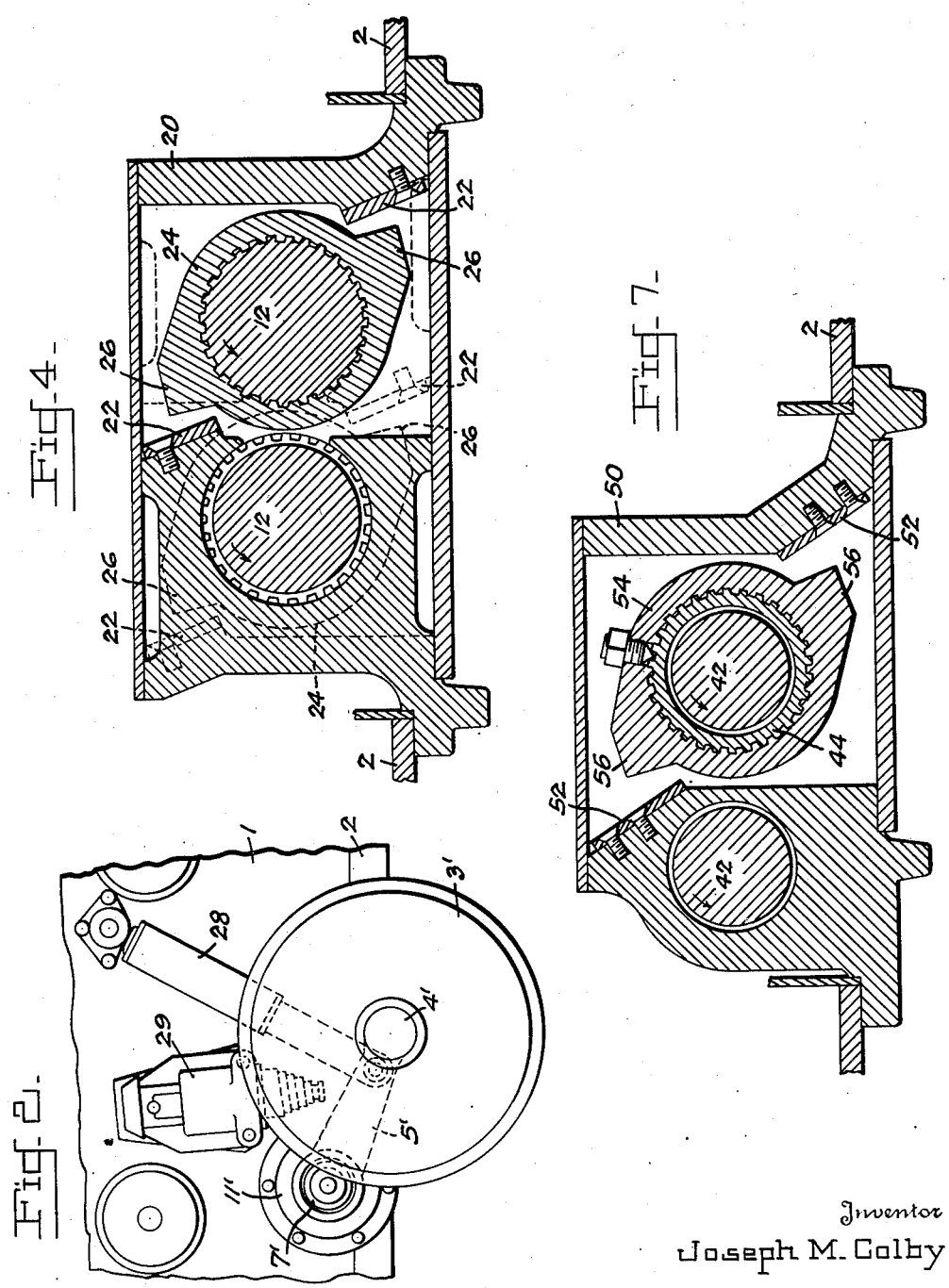
Inventor
Joseph M. Colby
By G. J. Kessenich & J. H. Church
Attorneys

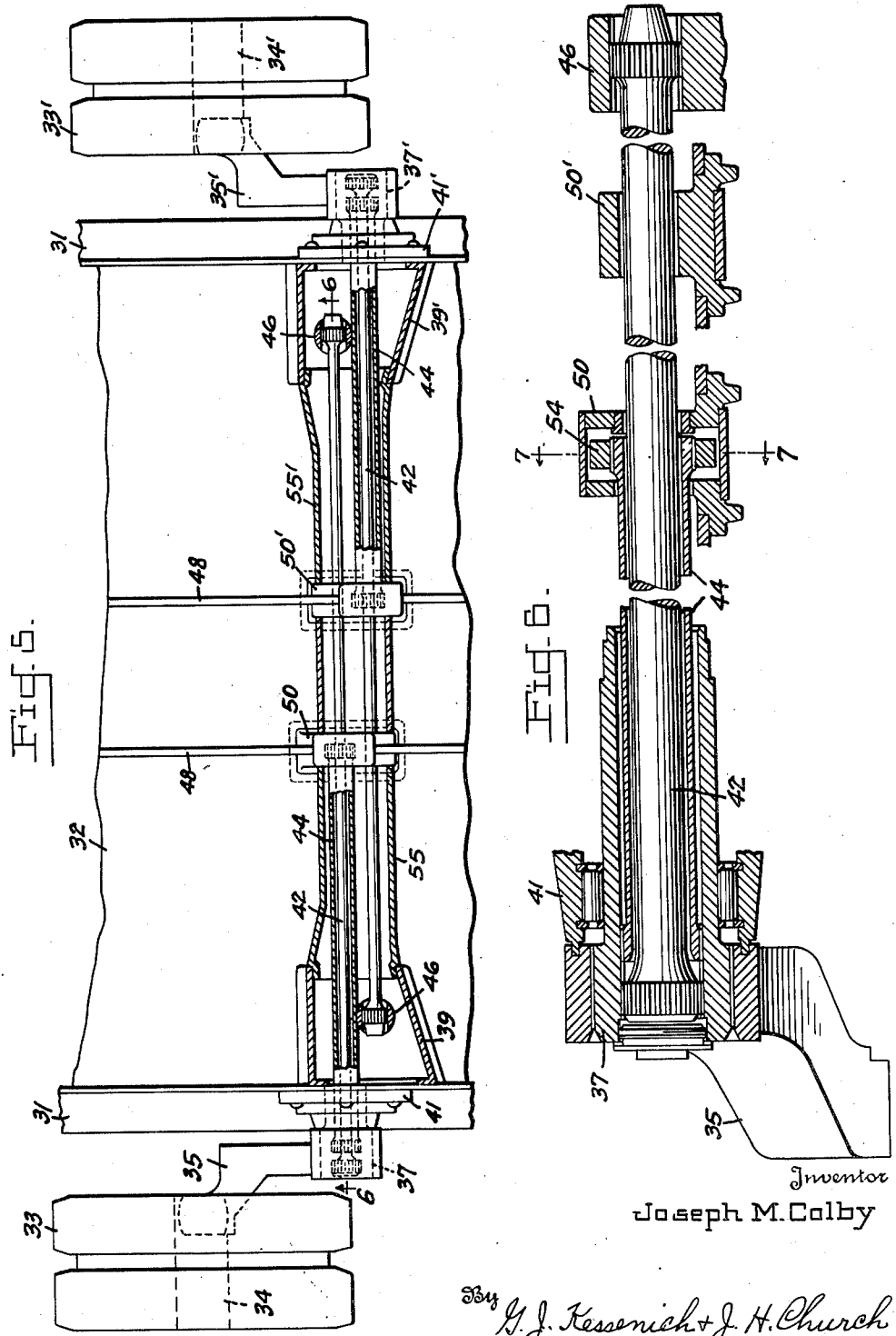

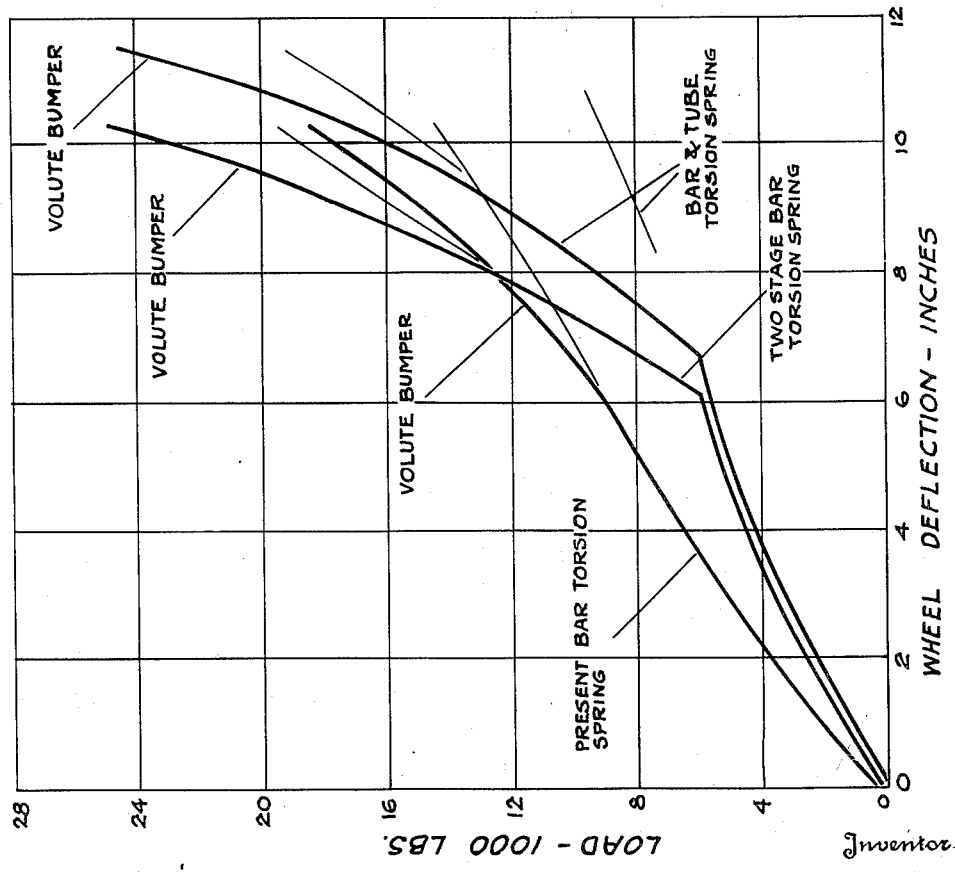

Patented Aug. 12, 1952

2,606,759

UNITED STATES PATENT OFFICE 2,606,759

TWO-STAGE TORSION SPRING SUSPENSION

Joseph M. Colby, Detroit, Mich.

Application March 23, 1948, Serial No. 16,603

5 Claims. (Cl. 267—57)

(Granted under the act of March 3, 1883, as amended April 30, 1928; 370 O. G. 757)

The invention described herein may be manufactured and used by or for the Government for governmental purposes without the payment of any royalty thereon.

This invention relates to a torsion spring suspension for vehicles, and more particularly to a two stage torsion spring suspension for vehicles having a high percentage of load variation.

Determined by the suspension of a vehicle are important vehicle characteristics, such as the comfort and safety of the crew or personnel in the vehicle, the reliablity of vehicle components in proportion to the ability of the suspension to absorb shock which otherwise might be transmitted to these components, the amplitude and frequency of vehicle pitch and roll, obstacle-crossing ability, since a suspension which provides greater vertical movement of wheels will enable the vehicle to negotiate higher and more abrupt obstacles, and greater tractive ability, as, for example, in the case of a track-laying vehicle where a suspension which permits the track to conform to irregular terrain features allows more effective grouser action.

In comparison with other types of spring suspension, the torsion bar suspension, because of its great shock-absorbing capacity, has been found to provide, with respect to the above vehicle characteristics, greater comfort and reduced fatigue of personnel, a more reliable vehicle since components are cushioned from shock, more stability, improved obstacle-crossing ability, higher sustained speed over irregular terrain, and, in the case of track-laying vehicles, better traction and more reliable track operation. Further, with respect to military vehicles such as combat vehicles and tanks, the torsion bar suspension provides greater protection, since most of the suspension is behind armor plate and it occupies no inside tank width. The torsion bar suspension, as is well known, includes a torsion shaft which is simply in the nature of a rod-spring designed to resist the torque or twisting movement of the applied force and to then untwist and return all components to normal position.

Exemplifying prior structure of the torsion bar suspension, a crank arm is rigidly attached at one of its ends to a wheel axle and at the other end of its ends to a torsion shaft running usually transversely, but sometimes longitudinally, under or through the vehicle. The crank arm end of the shaft turns freely in a bearing carried by the vehicle, while the other end of the shaft is anchored to the vehicle. Vertical movement or deflection of a wheel on the wheel axle is thus transmitted through the crank arm to the torsion shaft throughout the entire length thereof, and thereby twisting the torsion shaft. In order to increase the great shock absorbing capacity of the torsion bar suspension, a volute spring bumper has been added, which comes into action after a certain amount of vertical movement of the wheel. In addition to the volute spring bumper, double-acting shock absorbers have been added to damp out the high-amplitude pitch tendency of this suspension and to absorb energy.

In the above described and well known torsion bar suspension structure, loading of the wheel results in twisting in the torsion bar or shaft at a substantially uniform rate (load on wheel/distance of vertical movement or deflection of wheel), hereinafter referred to as (load/wheel deflection), which is satisfactory in the case of relatively constant weight vehicles such as armored cars and tanks. However, in the case of vehicles having a high percentage of load variation, such as trucks and cargo tractors, it is necessary that a difficult variable load factor be considered in designs for their torsion suspensions, complicated by consideration of effects of load on ride, weight on spring frequency, and impact on shock-absorbing capacity. Thus, in order to obtain satisfactory vehicle characteristics in vehicles having a high percentage of load variation, it is necessary that the desirable torsion spring suspensions therefor be such as to provide twist in the torsion spring member at a low rate (load/wheel deflection) for light or initial loads, and at a relatively high rate for heavy or subsequent loads. But since the well known torsion bar suspension structure provides twist in the torsion bar or shaft at only a substantially constant or uniform rate as above discussed, utilization of this structure in vehicles having a high percentage of load variation has resulted in failure to achieve the desirable vehicle characteristics in that twist in the torsion bar or shaft is at too high a rate for light or initial loads, or at too low a rate for heavy or subsequent loads, or both.

Accordingly, it is an object of this invention to provide for variable load vehicles a torsion spring suspension having a spring rate (load/wheel deflection) which is desirably low for light or initial loading and which is desirably relatively high for heavy or subsequent loading.

It is a further object of this invention to achieve desirable vehicle characteristics in a variable load vehicle by providing therefor such a torsion spring suspension having both a primary torsion spring member permitting proper vertical wheel deflection at light or initial loads, and a larger secondary torsion spring member automatically operable upon the reaching of a predetermined degree of torsion to permit proper vertical wheel deflection at heavy or subsequent loads.

A further object of this invention is to solve the complicated problem including the difficult variable load factor with respect to spring rates for satisfactory vehicle characteristics in a torsion spring suspension for a vehicle having a high percentage of load variation, by providing for such a vehicle a multiple stage torsion spring suspension which is simple in construction and which is efficient, effective, and automatic in operation.

An illustrative embodiment of the invention is disclosed by way of example in the following description and in the accompanying drawings in which:

Fig. 1 is a plan view, partly in section, of a portion of a vehicle and suspension embodying this invention;

Fig. 2 is a view in side elevation, with added shock absorbing members;

Fig. 3 is a sectional view on the line 3—3 of Fig. 1;

Fig. 4 is a sectional view on the line 4—4 of Fig. 3;

Fig. 5 is a plan view, partly in section, similar to Fig. 1, but showing a modification;

Fig. 6 is a sectional view on the line 6—6 of Fig. 5;

Fig. 7 is a sectional view on the line 7—7 of Fig. 6;

Fig. 8 is a load-wheel deflection chart.

Reference to these views will now be made by use of like characters which are employed to designate corresponding parts throughout.

Referring first to Figs. 1–4, reference numeral 1 designates an outer load member which is a part of the body or frame of a vehicle having a floor member 2 to be mounted on ground-engaging elements such as tracks or road wheels, two wheels 3 and 3' with respective crank arms 5 and 5' being shown, through a torsion spring suspension. Since, as shown, each of the two wheels 3 and 3' on opposite sides of the vehicle is individually sprung through a respective one of the two identical two stage torsion spring suspension constructions, a description of one of the latter is applicable to both, and will suffice.

A wheel 3 is rotatably mounted on a stub axle 4 carried by the outer or free end of crank arm 5. In the opposite end of crank arm 5 is welded a bearing sleeve member 7 transversely extending through load member 1 and crank arm housing 9, bearing sleeve member 7 being journalled in a support member 11 bolted to load member 1 supporting crank arm housing 9. Internally serrated outer end of bearing sleeve member 7 has fast therein matching serrated outer end of a heavy load torsion bar 12, the latter extending inwardly transversely of the vehicle and terminating in a serrated inner end. Extending inwardly transversely of the vehicle from within a crank arm housing 9', the latter being identical with crank arm housing 9 but on the opposite side of the vehicle, is a light load torsion bar 14 in axial alignment with torsion bar 12 and terminating inwardly in a serrated inner end adjacent the serrated inner end of torsion bar 12. Serrated outer end of torsion bar 14 is securely held within internally and correspondingly serrated anchor member 16, the latter being fixed or immovable within crank arm housing 9'. Welded or otherwise secured to floor 2 are webs 18, and surrounding the adjacent inner ends of torsion bars 12 and 14 which extend through a respective two of its opposite walls is a housing 20 welded to webs 18. Formed integrally with housing 20, and in the interior of the latter, on opposite walls thereof, are a pair of abutment portions or limit stops 22. Securely adjoining the adjacent serrated inner ends of torsion bars 12 and 14 is a correspondingly internally serrated sleeve 24 having formed integrally thereon a pair of lugs 26 simultaneously engageable with respective ones of stops 22 upon the rotation of sleeve 24 through a predetermined angle. Enclosure for torsion bars 12 and 14 is provided by respective housing portions 25 and 25' extending transversely of the vehicle and their outer ends welded respectively to crank arm housing 9 and 9' and their inner adjacent ends welded to housing 20. As indicated in Fig. 2, shock absorbing members such as double acting shock absorber 28 and volute bumper spring 29, both of standard and well known construction, may be added, shock absorber 28 being pivotally mounted at its ends on the vehicle and on crank arm 5, respectively, and volute bumper spring 29 being mounted on the vehicle to engage crank arm 5 upon a predetermined amount of vertical wheel deflection.

With the foregoing described construction with respect to Figs. 1–4, initial loading of wheel 3 results in twisting of the relatively small torsion bar 14 at a low rate (load/wheel deflection). At a predetermined amount of loading of wheel 3, lugs 26 on sleeve 24 joining the torsion bars 14 and 12 contact the limit stops 22, which prevents further loading of torsion bar 14. Subsequent further loading of wheel 3 is taken solely by the relatively larger torsion bar 12 at a higher rate.

Figs. 5–7 show a modification of the construction illustrated in Figs. 1–4. In Figs. 5–7, load member 31, floor 32, wheels 33 and 33', crank arms 35 and 35', stub axles 34 and 34', bearing sleeve members 37 and 37', crank arm housings 39 and 39', and support members 41 and 41', are identical in design, construction, and arrangement with the corresponding respective elements 1, 2, 3, and 3', 4 and 4', 7 and 7', 9 and 9', 11 and 11' shown in Figs. 1–4 and as above described. The remaining elements shown in Figs. 5–7, however, constitute a modification of the structure shown in Figs. 1–4. Since, as shown, each of the two wheels 33 and 33' on opposite sides of the vehicle is individually sprung through a respective one of the two identical two stage torsion spring construction modifications, a description of one of the latter is applicable to both, and will suffice.

Internally serrated outer end of bearing sleeve member 37 has fast therein a matching serrated end of a light load torsion bar 42, the latter extending transversely of the vehicle from within crank arm housing 39 and terminating at its other serrated end within crank arm housing 39' on the opposite side of the vehicle, the latter other serrated end of torsion bar 42 being securely held within internally and matchingly serrated anchor member 46 which is fixed or immovable within crank arm housing 39'. Concentric with torsion bar 42 is an outer relatively short heavy load torsion tube 44 extending transversely of the vehicle, the outer end of torsion tube 44 being within crank arm housing 39, and the other or inner end of torsion tube 44 forming an inner terminus of the latter between crank arm housings 39 and 39'. The outer end of torsion tube 44 is externally serrated and is securely held within bearing sleeve member 37 by means of matching internal serrations in the latter at a point adjacent to the similarly held corresponding end of torsion bar 42. Welded or otherwise secured to floor 32 is a web 48, and surrounding the inner end of torsion tube 44 is a housing 50, through which torsion bar 42 extends. Formed integrally with housing 50, and in the interior of the latter on opposite sides thereof, are a pair of abutment portions or limit stops 52. Securely fastened externally to the externally serrated inner end of torsion tube 44 is a matchingly internally serrated sleeve 54 having formed integrally thereon a pair of lugs 56 simultaneously engageable with respective ones of stops 52 upon the rotation of sleeve 54 through a predetermined angle. Enclosure for torsion bar 42 and torsion tube 44 is provided by housing portions 55 and 55' extending transversely of the vehicle, housing portions 55 and 55' having their outer ends welded respectively to crank arm housings 39 and 39', and having their inner adjacent ends welded to housing 50.

With the foregoing described construction with respect to Figs. 5–7, initial loading of wheel 33 results in twisting of torsion bar 42 at a low rate (load/wheel deflection). At a predetermined amount of loading of wheel 33, lugs 56 on sleeve 54 fixed to torsion tube 44 contact the limit stops 52, resulting in the engagement of torsion tube 44. Upon subsequent further loading of wheel 33, torsion bar 42 is reinforced by the action of torsion tube 44, which results in loading at a higher rate.

The curves in Fig. 8 show for comparison the rates (load/wheel deflection) of the present torsion bar spring suspension of the above described two stage torsion bar spring suspension of Figs. 1–4, and of the above described modification of the latter in the two stage torsion bar and tube spring suspension of Figs. 5–7, all with respect to a cargo tractor. It will be noted that both of the described two stage torsion spring suspension constructions of this invention show, in contrast to the substantially constant or uniform rate for the present well known torsion bar suspension, a desirable relatively low rate for initial or light loads, and a desirable relatively high rate for subsequent or heavy loads beyond a predetermined desired point.

While the invention has been shown in an embodiment and modification thereof as a pair of units for a pair of opposite wheels and extending transversely of a vehicle, it is understood that a plurality of units may be used in the same manner, that the invention is applicable to a vehicle having mobile supporting units including tracks as well as wheels, and that one or more units may extend longitudinally instead of transversely of the particular vehicle. Therefore, while a specific embodiment and modification thereof of the invention has been shown and particularly described, it will be understood that various alterations may be made without departing from the spirit of the invention as indicated by the appended claims.

I claim:

1. An improved torsion spring suspension unit for a vehicle subject to a variable load comprising, in combination, a crank arm member rotatably mounted at one end thereof to said vehicle, a mobile traction member for said vehicle and carried at the free end of said crank arm member, a primary torsion spring member designed to provide desired amounts of vertical deflection of said traction member with said variable load up to a predetermined amount, said primary torsion spring member at the respective ends thereof being held in rigid relationship to said vehicle and to said crank arm member at said one end thereof, a secondary relatively large torsion spring member designed to provide through reenforcement of said primary torsion spring member desired amounts of vertical deflection of said traction member with said variable load exceeding said predetermined amount, said secondary torsion spring member being rigidly connected at one end thereof to said one end of said crank arm member, and automatic rotation preventing means associated with said secondary torsion spring member at the other end thereof to render the latter automatically operable by rigidly holding said other end from rotation when said variable load exceeds said predetermined amount.

2. A two stage torsion spring suspension unit for a vehicle subject to variable light and heavy loads, comprising a crank arm rotatably mountable at one end thereof on said vehicle, a mobile traction support mounted at the free end of said crank arm to provide vertical deflection, first and second relatively small and large torsion springs each held in rigid connection through one of its ends to said one end of said crank arm, rotation preventing means for rigidly anchoring the other end of said small torsion spring to said vehicle, and stop means securable to said vehicle and automatically operable to engageably prevent rotation of the other end of said large torsion spring when said vertical deflection exceeds a predetermined amount.

3. A two stage torsion spring suspension unit for a vehicle subject to variable light and heavy loads, comprising a crank arm rotatably mountable at one end thereof on said vehicle, a mobile ground engaging member supported by the free end of said crank arm and thereby subject to vertical deflection, a torsion bar rigidly connected at one of its ends to said one end of said crank arm, rotation preventing means for rigidly anchoring the other end of said torsion bar to said vehicle, said torsion bar being designed to provide desired amounts of said vertical deflection with said variable loads up to a predetermined amount, a relatively large torsion spring member rigidly connected at one end thereof to said one end of said crank arm and in axial alignment with said torsion bar, said large torsion spring member being designed to provide through reinforcement of said torsion bar desired amounts of said vertical deflection with said variable loads in excess of said predetermined amount, and automatic stop means at the other end of said large torsion spring member automatically rendering the latter operable by preventing its rotation only when said amounts of said deflection are in excess of said predetermined amount.

4. A two stage torsion spring suspension unit for a vehicle subject to variable light and heavy loads, comprising a crank arm rotatably mountable at one end thereof on said vehicle, a mobile ground engaging member supported by the free end of said crank arm and thereby subject to variable vertical deflection by said variable loads, a torsion bar rigidly connected at one end thereof to said one end of said crank arm, rotation preventing means for rigidly anchoring the other end of said torsion bar to said vehicle, said torsion bar being designed to provide desired amounts of said vertical deflection up to a predetermined amount for said light loads, a torsion tube arranged concentrically about said torsion bar and having one end rigidly connected to said one end of said crank arm adjacent said one end of said torsion bar, said torsion tube being designed to provide through reinforcement of said torsion bar desired amounts of said vertical deflection exceeding a predetermined amount for said heavy loads, and stop means to automatically prevent rotation of the other end of said torsion tube and to thereby render the latter operable when said vertical deflection exceeds said predetermined amount.

5. In a vehicle subject to variable relatively light and heavy loads, an improved multiple stage torsion spring suspension unit comprising, in combination, a crank arm member rotatably mounted at one end thereof to said vehicle and carrying at the free end thereof a mobile traction support subject to vertical deflection variable with said loads, a primary torsion spring member designed to provide desired amounts of said vertical deflection with said variable light loads up to a predetermined amount, a secondary relatively large torsion spring member designed to provide through reinforcement of said primary torsion spring member desired amounts of said vertical deflection with said variable heavy loads exceeding said predetermined amount, said primary and secondary torsion spring members being arranged in relative axial alignment, means rigidly connecting each said torsion spring member through one end thereof to said one end of said crank arm member, rotation preventing means rigidly anchoring the other end of said primary torsion spring member to said vehicle, stop means secured to said vehicle adjacent the other end of said secondary torsion spring member, and automatic stop engageable means on said other end of said secondary torsion spring member and preventing rotation of the latter by automatic engagement with said stop means when said variable light loads exceed said predetermined amount.

JOSEPH M. COLBY.

REFERENCES CITED

The following references are of record in the file of this patent:

UNITED STATES PATENTS

| Number | Name | Date |
|---|---|---|
| 2,173,652 | Lee et al. | Sept. 19, 1939 |
| 2,246,044 | Hickman | June 17, 1941 |
| 2,254,261 | Best | Sept. 2, 1941 |
| 2,463,040 | MacPherson | Mar. 1, 1949 |

FOREIGN PATENTS

| Number | Country | Date |
|---|---|---|
| 450,142 | Great Britain | July 8, 1936 |
| 570,183 | Great Britain | June 26, 1945 |
| 609,444 | Germany | Feb. 15, 1935 |
| 865,881 | France | Mar. 17, 1941 |